United States Patent
Bodin et al.

(10) Patent No.: US 7,048,323 B2
(45) Date of Patent: May 23, 2006

(54) VEHICLE

(75) Inventors: Hans Bodin, Sodra Sunderbyn (SE); Martin Jonsson, Lulea (SE); Jan Krispinsson, Lulea (SE); Lars Wikstrom, Lulea (SE)

(73) Assignee: SSAB Hardtech AB, Lulea (SE)

( * ) Notice: Subject to any disclaimer, the term of this patent is extended or adjusted under 35 U.S.C. 154(b) by 0 days.

(21) Appl. No.: 10/523,057

(22) PCT Filed: Aug. 7, 2003

(86) PCT No.: PCT/SE03/01259

§ 371 (c)(1),
(2), (4) Date: Feb. 2, 2005

(87) PCT Pub. No.: WO2004/026604

PCT Pub. Date: Apr. 1, 2004

(65) Prior Publication Data

US 2005/0206191 A1      Sep. 22, 2005

(30) Foreign Application Priority Data

Aug. 8, 2002   (SE) .................................. 0202382

(51) Int. Cl.
*B62D 25/04* (2006.01)
*B60J 5/04* (2006.01)

(52) U.S. Cl. ............................ 296/146.6; 296/146.5; 296/187.12

(58) Field of Classification Search ............. 296/146.5, 296/146.6, 146.11, 146.1, 187.12, 193.06
See application file for complete search history.

(56) References Cited

U.S. PATENT DOCUMENTS

| 4,984,389 | A | * | 1/1991 | Benoit et al. ................ 49/502 |
| 5,040,334 | A | * | 8/1991 | Dossin et al. ................ 49/502 |
| 5,581,947 | A | * | 12/1996 | Kowall et al. ................ 49/451 |
| 6,176,542 | B1 | * | 1/2001 | Gooding et al. ......... 296/146.6 |
| 6,231,112 | B1 | * | 5/2001 | Fukumoto et al. ....... 296/146.5 |
| 6,302,473 | B1 | * | 10/2001 | Weber ..................... 296/146.6 |
| 6,517,142 | B1 | * | 2/2003 | Gehringhoff et al. .... 296/146.6 |
| 6,663,166 | B1 | * | 12/2003 | Achleitner ............... 296/146.6 |

FOREIGN PATENT DOCUMENTS

SE              518503           8/2002

* cited by examiner

*Primary Examiner*—D. Glenn Dayoan
*Assistant Examiner*—Greg Blankenship
(74) *Attorney, Agent, or Firm*—Mark P. Stone

(57) ABSTRACT

A vehicle door has a supporting press formed frame (10) of high-strength steel that has two standing hat beams (13, 15) interconnected by an upper horizontal hat beam (14), a lower horizontal hat beam (16) and intermediate side impact guard beam (22). The hat beams have their crowns (12) directed towards the interior of the vehicle and they carry an outer panel (28) by their outer side flanges (17). The standing hat beams (13, 15) have a profile height on at least portion (23, 24, 28) of their length that overlaps the corresponding pillar (30, 34). Thereby, in a frontal crash, the frame of the door can transmit force from the A-pillar of the vehicle to the B-pillar.

19 Claims, 4 Drawing Sheets

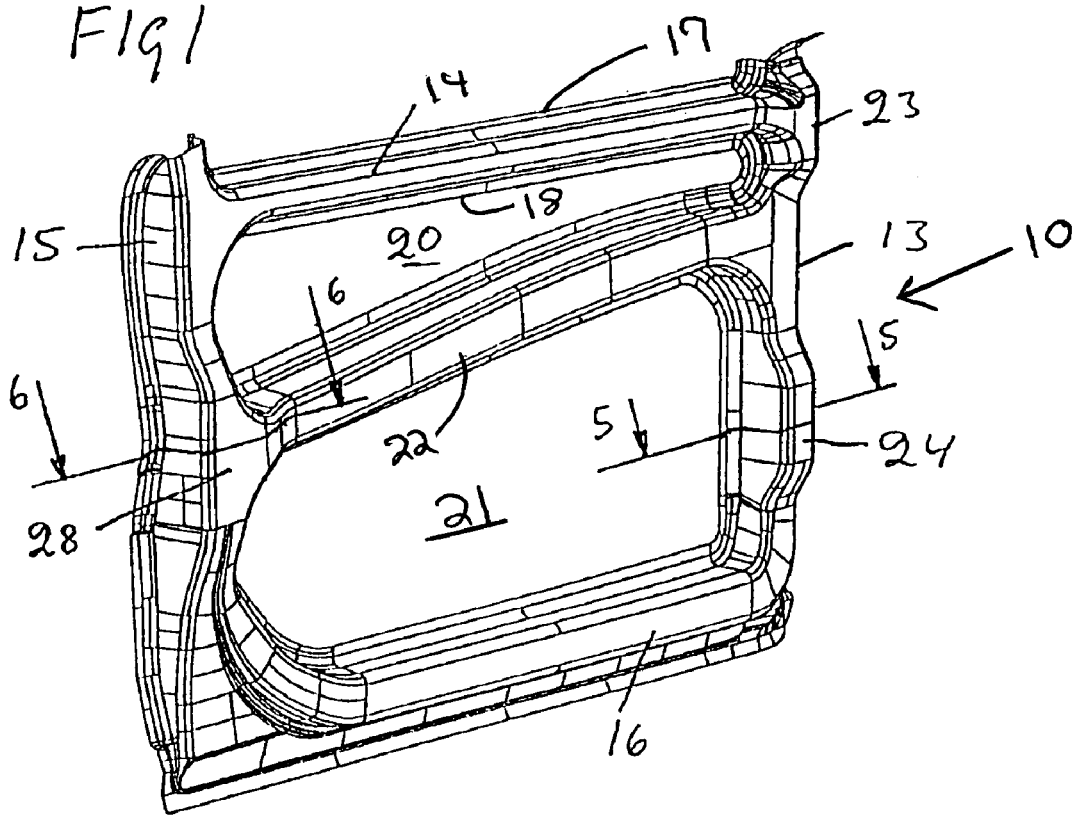
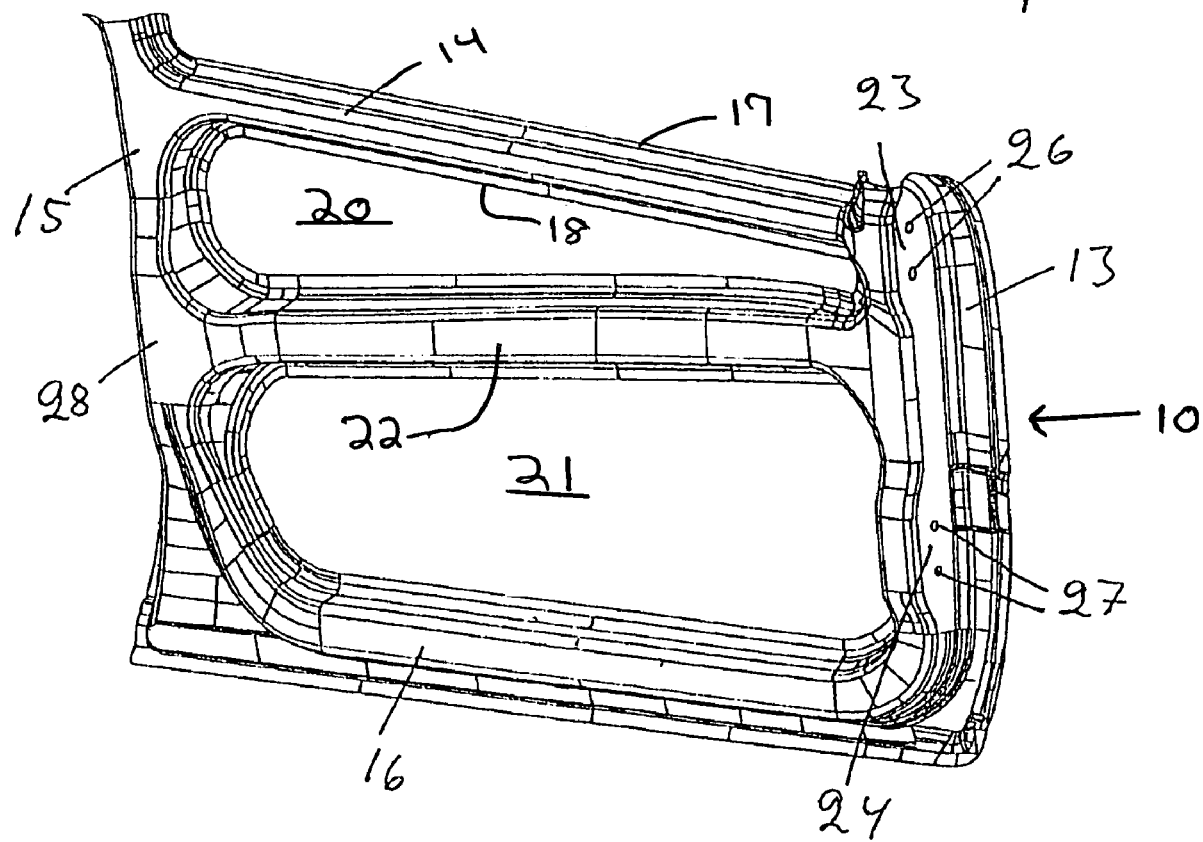

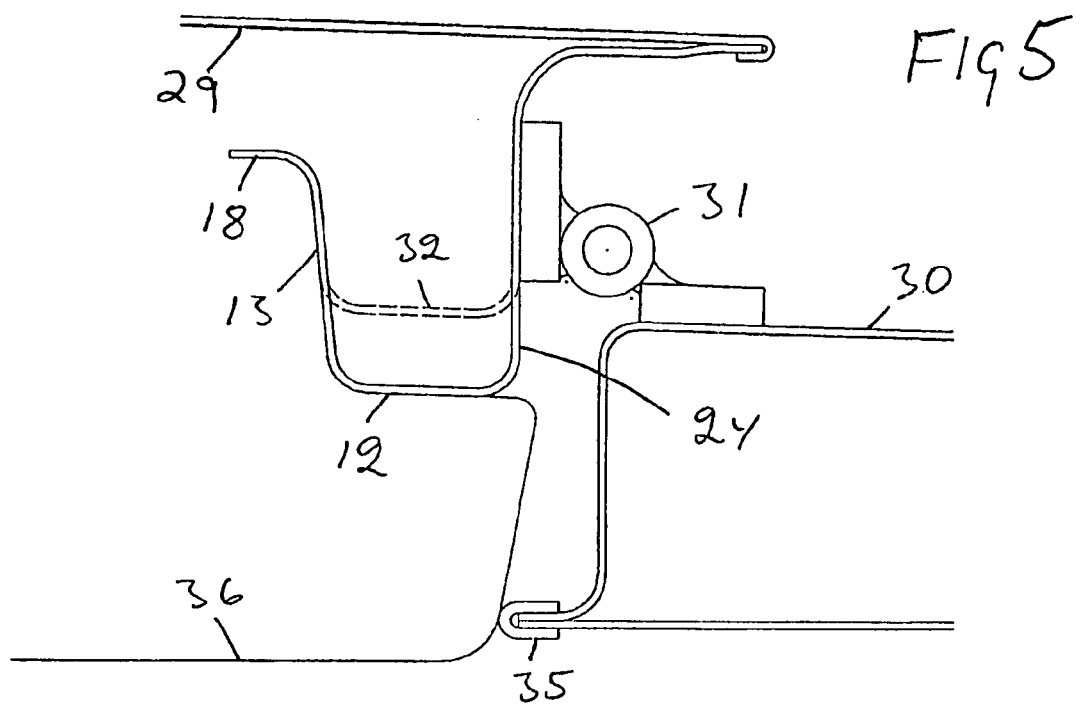
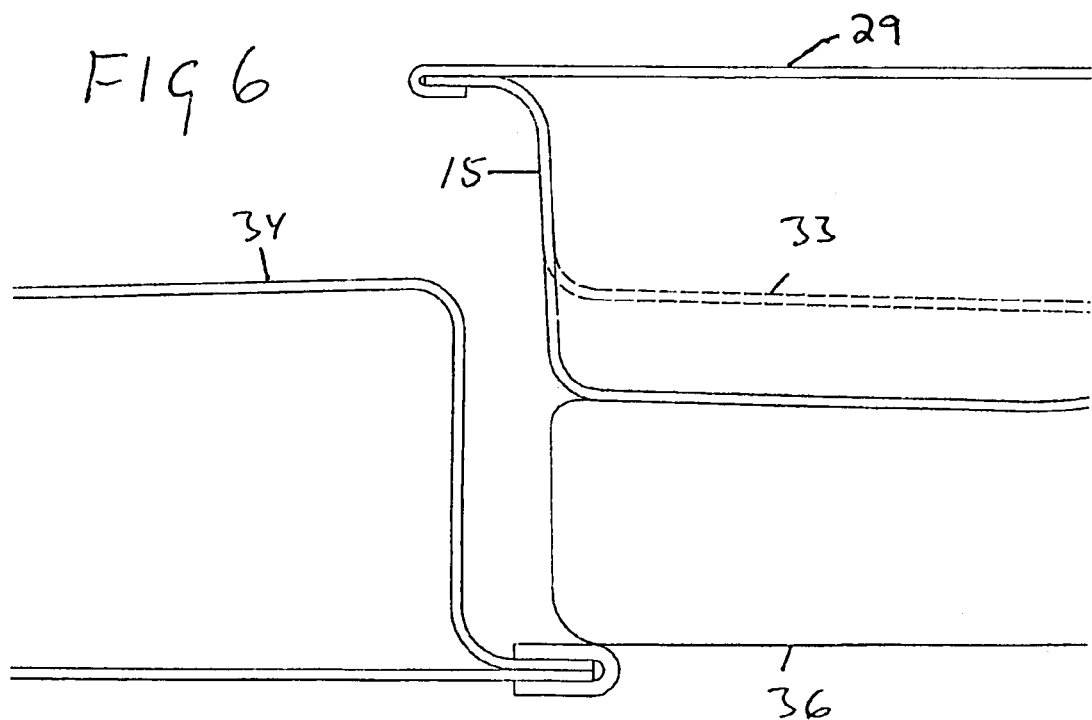

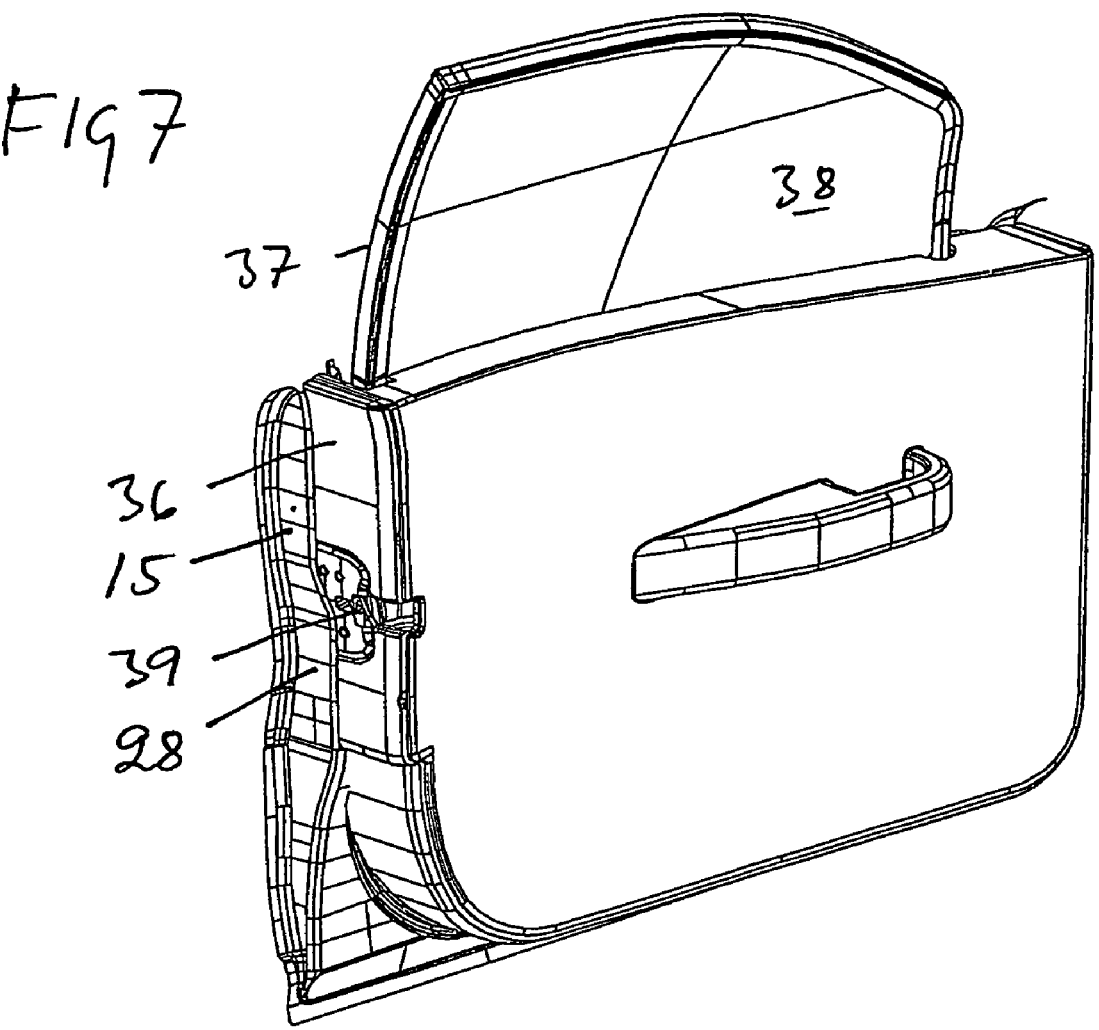

VEHICLE

TECHNICAL FIELD OF THE INVENTION

This invention relates to a vehicle with a door that is suspended by hinges in a pillar in front of it and has a lock cooperating with a pillar at the back of it.

TECHNICAL BACKGROUND OF THE INVENTION AND BRIEF DESCRIPTION OF PRIOR ART

Modern vehicle doors usually consist of a supporting deep drawn so called inner panel, which comprise the entire thickness of the door. An outer panel is bent around the edges of the inner panel and has cement in its bends. The inner panel is deep drawn and it can therefore not be made of high-strength steel. A so called waist rail below the window is welded to the inner panel and it can be located outside of or inside of the window. A side impact guard beam of steel with considerably higher strength than the inner panel is also welded to the inner panel and located close to the outer panel. A comparatively flat trim is fastened on the inner panel. The interior elements of the door, such as window guides and window lifts are located inside the deep inner panel. The end sides of the door consist completely of the end sides of the inner panel and the side of the inner panel adjacent the vehicle interior has only small openings, which makes the mounting of the interior elements difficult.

OBJECT OF INVENTION AND BRIEF DESCRIPTION OF THE INVENTION

It is an object of the invention to provide a vehicle door that is lighter in weight and stronger than conventional doors and that can transmit force from the pillar in front of it to the pillar at the rear of it in a frontal crash and that has a fairly small risk of being stuck in closed position after such a crash.

This is achieved principally in that the door has a supporting press formed frame of high-strength steel that has two standing hat beams interconnected by an upper horizontal hat beam, a lower horizontal hat beam and an intermediate side impact guard beam, the hat beams having their crowns directed towards the interior of the vehicle and carrying an outer panel by their outer side flanges, and at least one of the standing hat beams having a profile height on at least a portion of its length that overlaps the corresponding pillar.

The invention is defined by the claims

BRIEF DESCRIPTION OF THE DRAWINGS, WHICH ILLUSTRATE A PREFERRED EMBODIMENT

FIG. 1 is a perspective view of a frame of a door seen obliquely from the inside/behind FIG. 2 show the frame in FIG. 1 seen obliquely from the inside/front.

FIG. 5 is a section taken as indicated by the arrows 5—5 in FIG. 1.

FIG. 6 is a section taken as indicated by the arrows 6—6 in FIG. 1.

FIG. 7 is a perspective view of an assembled door built on the frame shown in FIG. 1.

DESCRIPTION IN MORE DETAIL OF ILLUSTRATED EMBODIMENT

Figure 3:
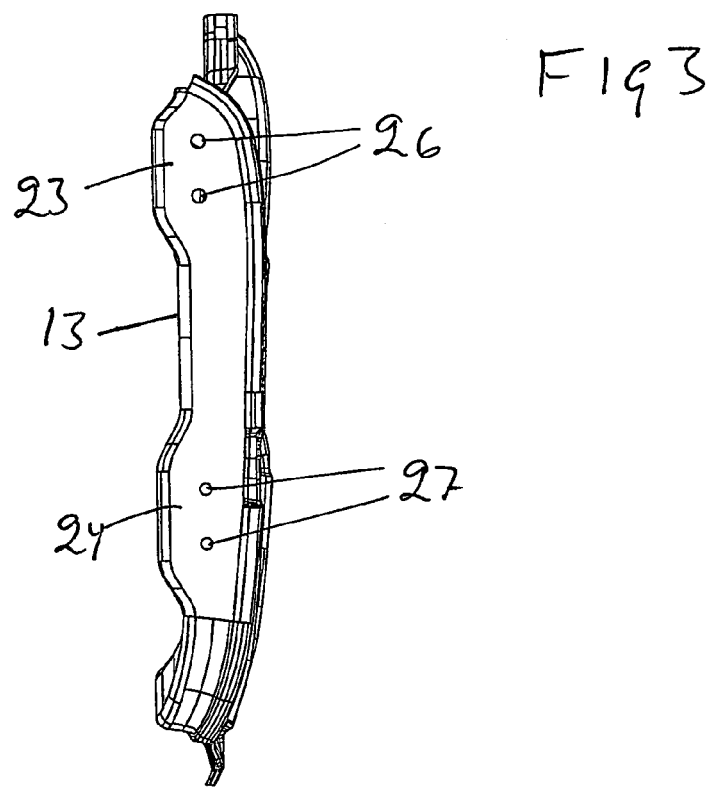
FIG. 3 is an end view seen from the front.

FIGS. 1 and 2 show a frame 10 of a left front door of a vehicle and the frame is seen from inside the vehicle and obliquely from behind. The frame is formed from a flat sheet so that it has got an annular hat beam 13, 14, 15, 16 with a crown 12 and side flanges 17, 18 and intermediate webs. The outer side flanges 17 have varying width so that they adapt to the outer panel of the door. The hat beam has its crown directed towards the interior of the vehicle. The annular hat beam consists of two standing hat beams 13, 15 interconnected by two horizontal hat beams 14, 16. A hole 20, 21 is formed in the middle of the annular hat beam and a side impact guard beam 22 extends between the standing beam portions 13 and 15 and bridges the hole 20, 21. The beam 22, too, can have an open profile with its crown inwards as shown, but it may also have a cover fastened by spot welding. It may also have another cross section and it may for example have a double hat profile and have its open side towards the vehicle interior. Various portions of the hat beam 13, 14, 15, 16 may have various profile and some portions may for example be a double hat.

An outer panel 29 of sheet metal is shown in FIGS. 5 and 6. It is bent around the outer side flange 17 of the hat beam portions 13, 15, 16 and it has cement in the bends. The side impact guard beam 22 as well as the other parts of the supporting frame will be just adjacent to the outer panel, that is, the impact guard will be as far out from the passenger as possible, which is advantageous.

Figure 4:
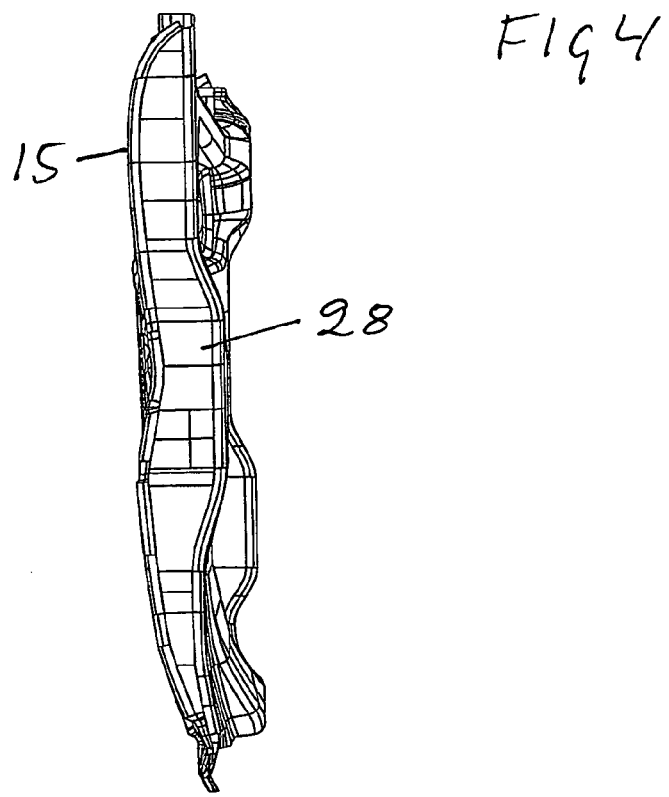
FIG. 4 is an end view seen from behind

FIG. 3 shows the front end side of the frame, that is, the standing hat beam 13, and FIG. 4 shows the rear end side, that is, the standing hat beam 15. As can be seen in these figures as well as from FIGS. 1 and 2, the standing hat beam 13 at the front has two portions 23,24 that are wider than an intermediate portion 25 and they extend therefore more into the interior of the vehicle. These widened portions 23,24 have holes 26,27 for the fastening of the hinges as can be seen in FIG. 3.

The rear standing hat beam 15 has a portion 28 at its middle, which is curved inwards and thus extends more inwards the interior of the vehicle than the other portions of the beam. The rear end of the side impact guard beam 22 joins the beam 15 at this portion 28 and its front end joins the standing beam 13 at the area for the upper hinge just below the widened portion 23 so that the impact guard beam will slope to the back.

FIG. 5 is a section through the widened portion 24 of the standing beam 13 at the front, taken as indicated by line 5—5 in FIG. 1. In the figure, the pillar 30 is shown, which carries the hinges 31 of the door. When the door is a front door, this is the A-pillar. The dofted line 32 illustrates the profile of the standing beam 13 in the area between the two widened portions 23,24. The profile of the widened portion 24, as well as the profile of the widened portion 23, overlaps the pillar 30 whereas the profile of the beam between the widened portions does not. A sealing strip 35 on the pillar seals against an inner panel 36 of the door. If the hat beam 15 does not have its outer surface curved inwards as shown but has its overlapping portion widened, then, from the forming point of view, it may be advantageous to join the rear end of the impact guard beam below the widened portion in the same way its front end is joined below the widened portion 23.

FIG. 6 is a section taken through the in-curved portion 28 of the standing beam 15 as indicated by line 6—6 in FIG. 1. In the figure, the pillar 34 at the rear of the door is shown and this pillar is the B-pillar when the door is a front door. The profile of the standing hat beam 15 overlaps the pillar whereas the other portions of the beam do not, as can be seen from the dotted line 33.

Because the standing hat beams of the frame have portions that overlap the front and rear pillars, the frame of the door will be able transmit force from the front pillar to the rear pillar in a front collision, which is important particularly for a front door. In some cases, it might suffice that only one of the standing hat beams overlaps the adjacent pillar. The mounting of the lock may for example be made strong enough to take up the forces and then, the rear standing hat beam need not overlap the rear pillar.

The longitudinal forces will be largest in off-set crashes since all the energy will be taken up by only one side and it is advantageous that the impact guard beam 22 has its front end joined high up in order to take up force from the upper part of the A-pillar. Then, it is advantageous that it slopes to the back as shown so that it will be located right as a side impact guard.

FIG. 7 shows a complete door. An inner panel 36 is mounted on the frame 10 and between the frame and the inner panel is mounted a window structure with a protruding window frame. The holder for the rear view mirror is not illustrated in the figures but it can suitably be an integrated part of the frame 10. The inner panel 36 has end sides and a bottom, which connect to the hat beam of the frame, and the frame and the inner panel thus form together the end sides and the bottom of the door. The inner panel has also an upper edge that connects to the window 38. Suitably, all the inner elements of the door such as the lock 39, that co-acts with a non-illustrated means on the pillar, and the window structure 37 will be pre-mounted on a frame to a unit that also may comprise the inner panel 36, and this entire unit be mounted on the frame 30 by screws through the inner panel. Thus, the inner panel need not be supporting but may for example be made of plastic and be covered by a snap-on trim that covers the screws. The inner panel 36 may be deep and present a large part of the thickness of the door instead of the supporting portion of the door comprising practically the entire door thickness.

In this way, one will achieve a very high strength of the supporting frame 10 of the door. Its thickness can be less than half the thickness of the door. The forming of the frame will be facilitated by the frame being thin in comparison with the entire door thickness and a frame can therefore be made that has steel of very high strength. In a conventional door that has a deeper forming of its supporting part, one must use steel with lower strength.

Suitably, the frame 10 of the door is formed in the press hardening method, that is, a blanket of hardenable flat steel sheet is hot stamped into the supporting frame with its integrated side impact guard beam and the thus formed frame is hardened while remaining in the forming tools. Then, when assembling the door, one attaches the outer panel to the supporting frame.

Since the frame 10 of the door can be made comparatively thin, it can alternatively be cold formed in high strength cold-forming steel, but then, as high strength cannot be reached as with the press-hardening method. With the latter, yield strengths of over 1000 N/mm$^2$ or at least 800 N/mm$^2$ can be reached, somewhat depending on the thickness of the frame. The rupture strain will also be less for cold-forming than for hot stamping. However, a vehicle door according to the invention will be advantageous also if it has steel with comparatively low strength, for example a yield strength of 350 N/mm$^2$, but it may probably be possible to use cold-forming steel having a yield strength of 500 N/mm$^2$ or more.

Besides giving a door that is both lighter in weight and stronger than a conventional door, the construction of the illustrated door makes the initial assembling easier and faster, and it makes the door easier to dismount for service and to reassembly. All the units of the door will be easily available since all the elements are located at the inside of the supporting frame.

Since the frame of the door can be made thin and located close to the outer panel but still have some overlap with the pillars, it will function well for transmitting force from A-pillar to B-pillar and the risk of the door being jammed in an off-set frontal crash will be small as compared with conventionally built vehicle doors.

The invention claimed is:

1. A vehicle door that is suspended by hinges in a front pillar and has a lock cooperating with a rear pillar, characterised in that the door has a supporting press formed frame (10) of high-strength steel that has front and rear standing hat beams (13, 15) interconnected by an upper horizontal hat beam (14), a lower horizontal hat beam (16), and an intermediate side impact guard beam (22), the hat beams having crowns (12) directed towards the interior of the vehicle and carrying an outer panel (29) on outer side flanges (17) of said hat beams, said front standing hat beam (13) having a varying profile height along its length and having at least a portion that overlaps said front pillar (30) and a portion that does not overlap said front pillar.

2. A vehicle door according to claim 1, characterised in that the rear standing hat beam (15) overlaps the rear pillar (34) along a portion of the length of said rear standing hat beam.

3. A vehicle door according to claim 1, characterised in that the front standing hat beam (13) overlaps the front pillar (30) with a said portion (23) adjacent the upper one of the hinges of the door.

4. A vehicle door according to claim 3, characterised in that the front standing hat beam (13) overlaps the front pillar (30) solely adjacent the two hinges of the door but not in the area therebetween.

5. A vehicle door according to claim 1, characterised in that the side impact guard beam (22) is a hat beam having its crown directed towards the interior of the vehicle.

6. A vehicle door according to claim 1, characterised in that the side impact guard beam slopes to the back.

7. A vehicle door according to claim 6, characterised in that the side impact guard beam (22) joins with the front standing hat beam (13) adjacent the upper one of the hinges but below it.

8. A vehicle door according to claim 2, characterised in that the front standing hat beam (13) overlaps the front pillar (30).

9. A vehicle door according to claim 2, characterised in that the side impact guard beam (22) is a hat beam having its crown directed towards the interior of the vehicle.

10. A vehicle door according to claim 3, characterised in that the side impact guard beam (22) is a hat beam having its crown directed towards the interior of the vehicle.

11. A vehicle door according to claim 4, characterised in that the side impact guard beam (22) is a hat beam having its crown directed towards the interior of the vehicle.

12. A vehicle door according to claim 2, characterised in that the side impact guard beam slopes to the back.

13. A vehicle door according to claim 3, characterised in that the side impact guard beam slopes to the back.

14. A vehicle door according to claim 4, characterised in that the side impact guard beam slopes to the back.

15. A vehicle door according to claim 5, characterised in that the side impact guard beam slopes to the back.

16. A vehicle door according to claim 8, characterised in that the side impact guard beam (22) is a hat beam having its crown directed towards the interior of the vehicle.

17. A vehicle door according to claim 8, characterised in that the side impact guard beam slopes to the back.

18. A vehicle door that is suspended by hinges in a front pillar and has a lock cooperating with a rear pillar, characterized in that the door has a supporting press formed frame (10) of high-strength steel that has front and rear standing hat beams (13, 15) interconnected by an upper horizontal hat beam (14), a lower horizontal hat beam (16), and an intermediate side impact guard beam (22), the hat beams having crowns (12) directed towards the interior of the vehicle and carrying an outer panel (29) on outer side flanges (17) of said hat beams, said rear standing hat beam (15) having a varying profile height along its length and having at least a portion that overlaps said rear pillar (34) and a portion that does not overlap said rear pillar.

19. A vehicle door according to claim 18, characterized in that the front standing hat beam (13) overlaps the front pillar (30) along a portion of the length of said front standing hat beam.

\* \* \* \* \*